Figure 4:
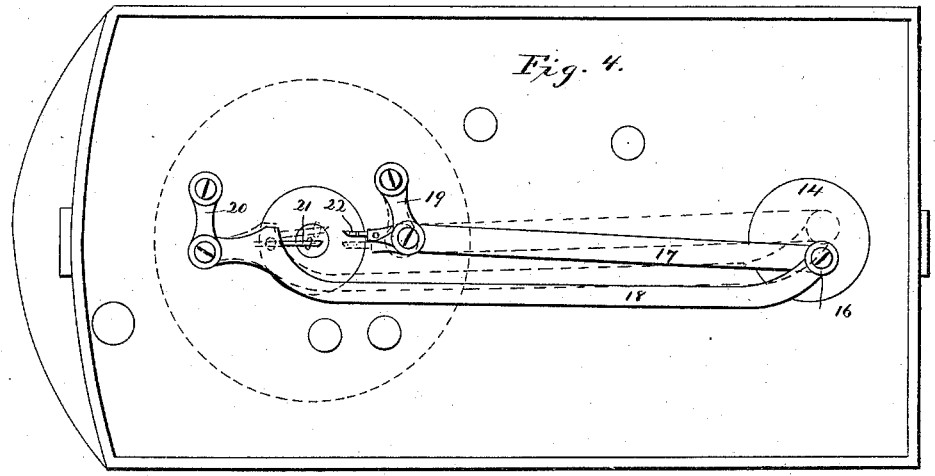

(No Model.)  T. F. HAGERTY.  5 Sheets—Sheet 1.
BUTTON HOLE SEWING MACHINE.
No. 335,029.  Patented Jan. 26, 1886.
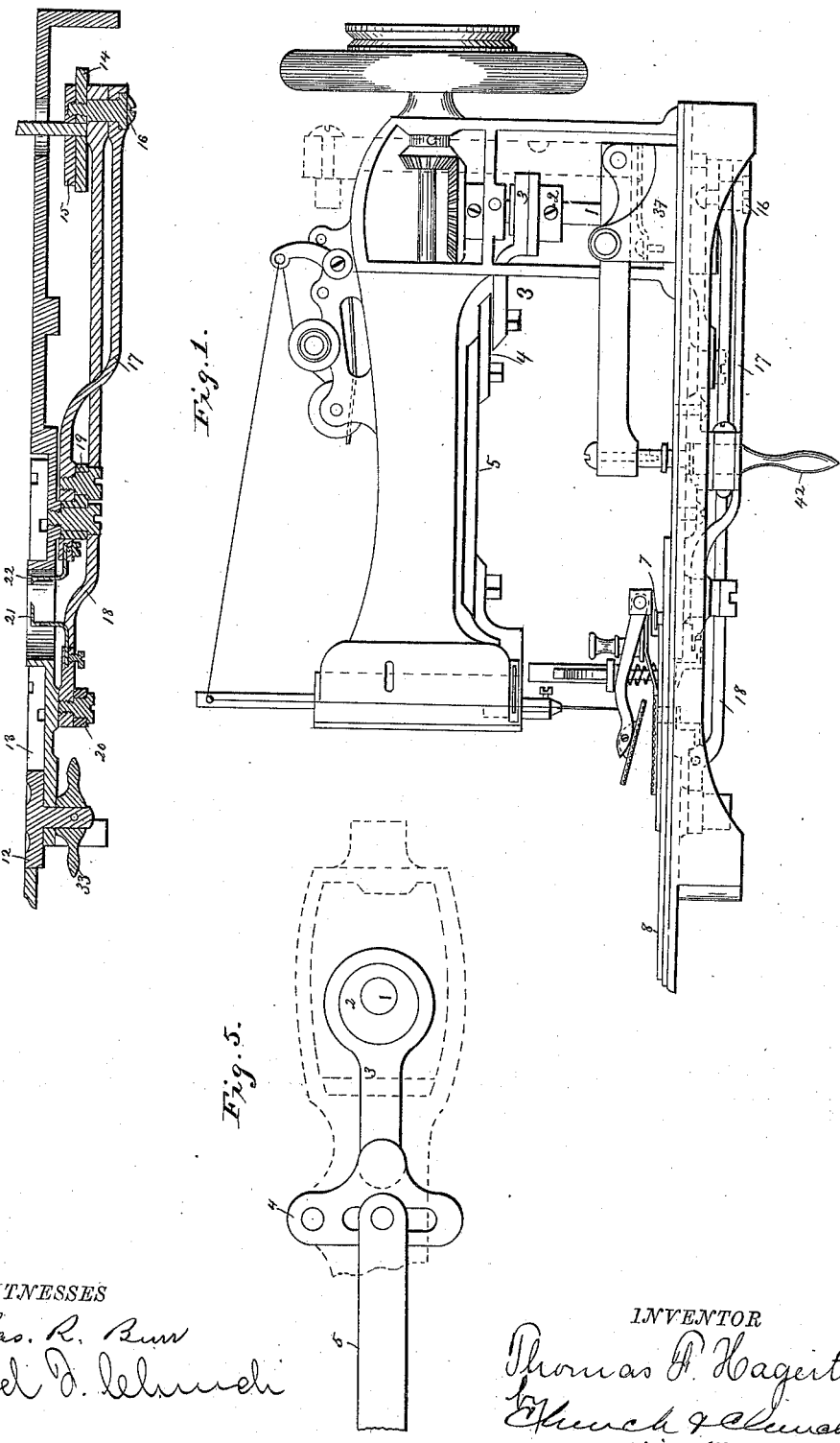

(No Model.) 5 Sheets—Sheet 2.
T. F. HAGERTY.
BUTTON HOLE SEWING MACHINE.
No. 335,029. Patented Jan. 26, 1886.
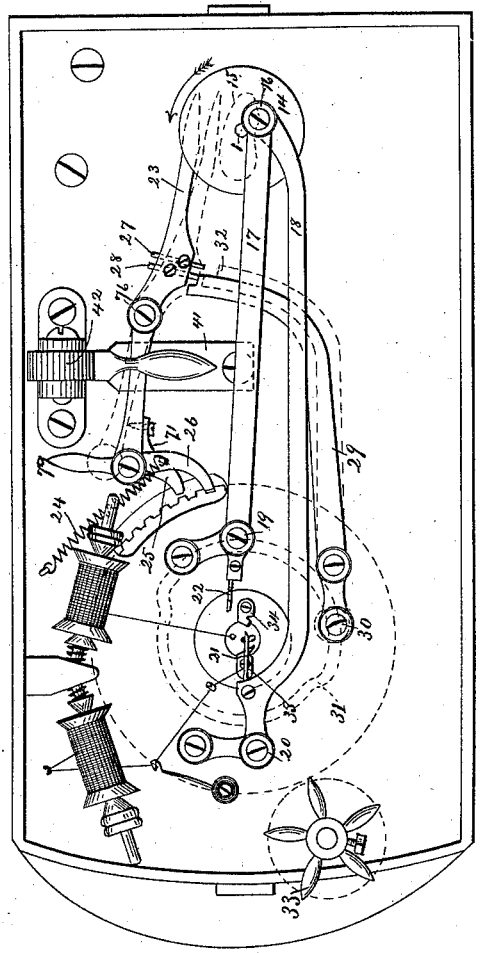
WITNESSES
Chas. R. Burr
Fred J. Church
INVENTOR
Thomas F. Hagerty
by Church & Church
His Attorneys (No Model.)  5 Sheets—Sheet 3.

T. F. HAGERTY.
BUTTON HOLE SEWING MACHINE.

No. 335,029.  Patented Jan. 26, 1886.

WITNESSES
Chas R. Burr
Fred T. Church

INVENTOR
Thomas F. Hagerty
by
Church & Church
His Attorneys (No Model.) 5 Sheets—Sheet 4.

T. F. HAGERTY.
BUTTON HOLE SEWING MACHINE.

No. 335,029. Patented Jan. 26, 1886.

WITNESSES
Chas. R. Burr
Fred J. Church

INVENTOR
Thomas F. Hagerty
by Church & Church
/his Attorneys (No Model.)
5 Sheets—Sheet 5.
T. F. HAGERTY.
BUTTON HOLE SEWING MACHINE.
No. 335,029. Patented Jan. 26, 1886.
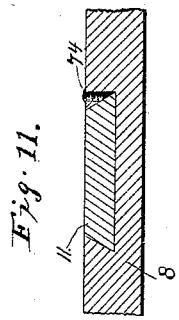
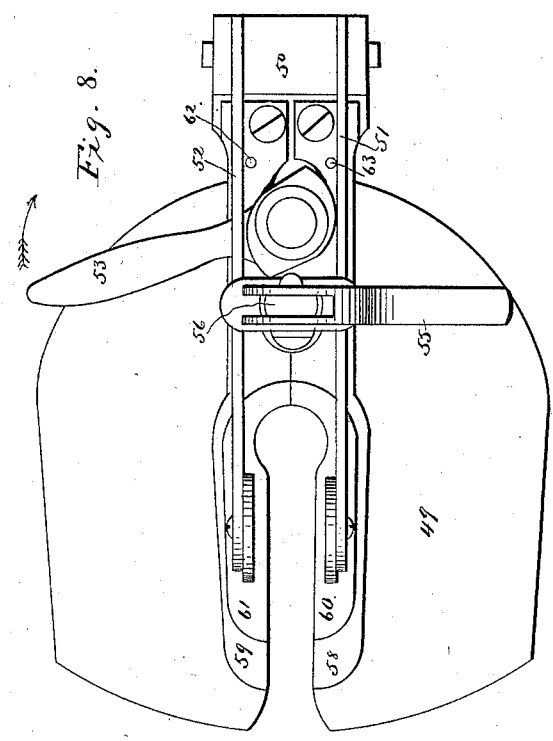
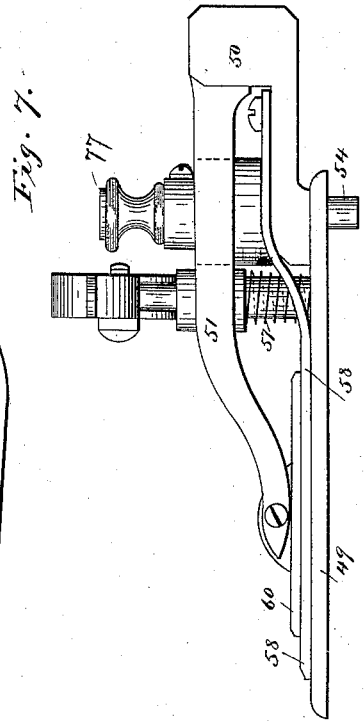
WITNESSES
Chas. R. Burt
Fred F. Church
INVENTOR
Thomas F. Hagerty
by Church & Church
His Attorneys

UNITED STATES PATENT OFFICE.

THOMAS F. HAGERTY, OF SAN FRANCISCO, CALIFORNIA.

BUTTON-HOLE SEWING-MACHINE.

SPECIFICATION forming part of Letters Patent No. 335,029, dated January 26, 1886.

Application filed April 25, 1884. Serial No. 129,270. (No model.)

*To all whom it may concern:*

Be it known that I, THOMAS F. HAGERTY, of San Francisco, in the county of San Francisco and State of California, have invented certain new and useful Improvements in Button-Hole Sewing-Machines, of which the following is a full, clear, and exact description, reference being had to the accompanying drawings, forming a part of this specification, and to the figures and letters of reference marked thereon.

My invention relates to that class of button-hole sewing-machines having, first, a reciprocating needle-bar contained within a pivoted carrying-frame, the latter receiving a lateral vibratory motion from the upright gear-shaft of the machine, whereby during the sewing operation the needle is caused to pass alternately through the slit of the button-hole and the edge of the cloth bounding said slit; secondly, a cloth-clamp moving within a fixed path about a slotted guide-button attached to the base-plate of the machine beneath the reciprocating needle, said clamp being designed to spread the unsewed button-hole and feed the bounding edges in such manner beneath the needle that the latter shall first sew one side of the button-hole, then the eye at a greater rate of speed, and finally the second side at the initial speed; thirdly, mechanism for imparting variable motion to said cloth-clamp; and, fourthly, mechanism for forming the loops and completing the stitches.

My improvement consists, first, in mechanism for vibrating the needle-bar-carrying frame and for regulating the throw of the same; secondly, in a novel construction of the cloth-clamp proper, whereby the cost of production is lessened and its durability and effectiveness enhanced; thirdly, in a modified construction and location of the auxiliary spring-pressed guide-button bearing against the edge and holding the clamp in place and steadying its movements; fourthly, in novel mechanism for operating the clamp feeding-wheel at the different rates of speed required; fifthly, in novel mechanism for moving the feeding-wheel by hand into position to commence sewing; sixthly, in novel means for regulating the length of the button-holes; and, seventhly, in mechanism for forming the loops each independently of the other.

Figure 3:
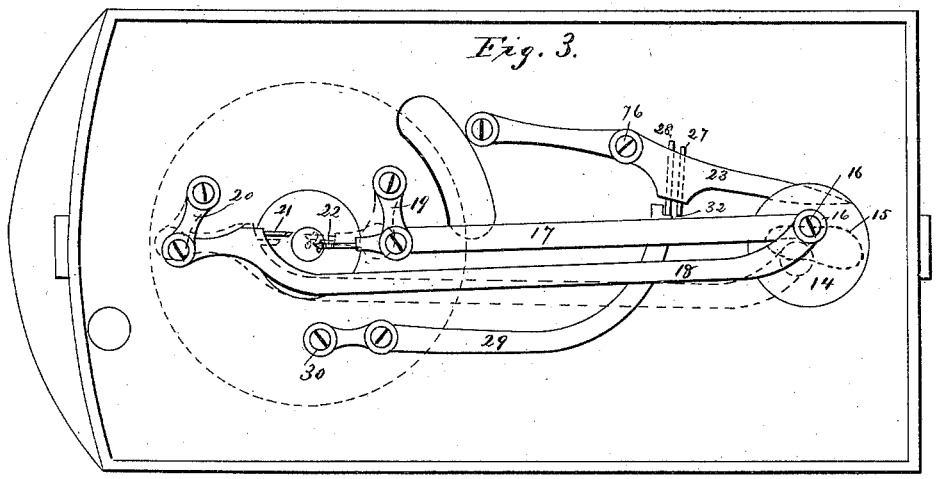
Figure 6:
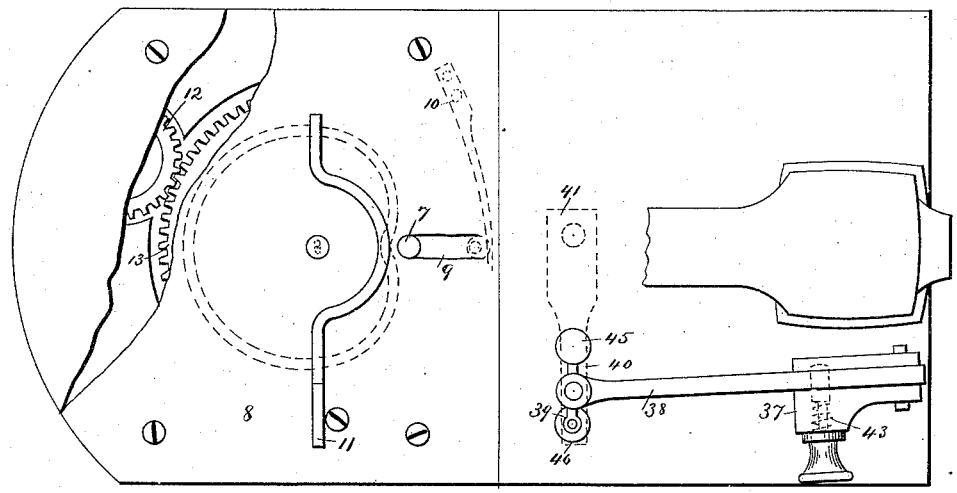
Figure 10:
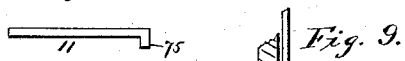
Figure 9:
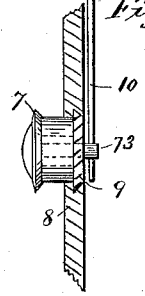
Figure 15:
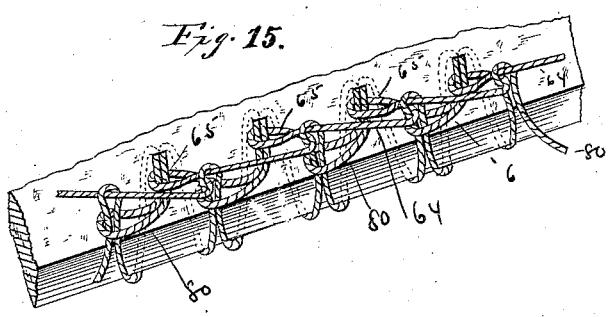

Referring to the drawings, Figure 1 is a front side elevation, the side plate being omitted, illustrating my improvements in the cloth-clamp and in the mechanism for vibrating the needle-bar-carrying frame and regulating its throw. Fig. 2 is a bottom plan view showing the mechanism for operating the loopers and clamp feed-wheel. Figs. 3 and 4 are detail bottom plan views illustrating the operation of the loopers during the process of forming the stitch. Fig. 5 is an enlarged detail plan view, partly broken away, of the mechanism employed to vibrate the needle-bar-carrying frame and to regulate its throw. Fig. 6 is a top plan view of the slotted base-plate, showing the location of the spring-pressed guide-button which bears against the edge of the cloth-clamp, and also the adjusting-piece for regulating the length of the button-holes. Fig. 7 is a side elevation, and Fig. 8 a plan view, of the cloth-holding clamp. Fig. 9 is a full-sized detail view, partly broken away, showing the spring-pressed guide-button and its connection with the base-plate of the machine. Fig. 10 is a full-sized view of the device for regulating the length of the button-holes. Fig. 11 is a cross-section illustrating the manner in which said regulator is connected with the base-plate of the machine. Fig. 12 is a central sectional view showing the position of the looper-levers and their actuating mechanism and the bent looper-points. Fig. 13 is a view of the path traveled in front and rear of the needle-holes by the looper-points during the operation of forming the stitches. Fig. 14 is a view showing the manner in which the under thread is interwoven between the stitches, the upper thread not being shown. Fig. 15 is a view showing both threads and the manner of interlocking them so as to form the finished button-hole.

The overhanging arm, the vibrating needle-bar-carrying frame, the feeding-wheel having heart-shaped cam-groove, the thread-nipper, and the spring take-up are of well-known construction, and form no part of my invention.

By reference to the drawings, Fig. 1, it will be seen that the vertical shaft 1 has attached to its upper end below the larger beveled gear-wheel an eccentric, 2, around which is fitted a strap, 3. The latter is provided with a forward extension, which passes through an opening in the standard of the overhanging arm of the machine, and is attached to a slotted adjusting-lever, 4, said lever being attached to a link, 5, connected to the needle-bar-carrying frame. By means of this construction (shown in detail in Fig. 5) I am enabled at will to regulate the length of throw of the carrying-frame, and consequently the width of the stitches made by the reciprocating needle. Thus to make a narrow row of stitches the screw which secures the inner end of the link 5 to the slotted lever 4 is slackened and moved toward the rear of the slot. To make a wider row of stitches the screw and link end are moved out toward the front of the slot in like manner, whereupon the vibrating carrying-frame will receive a longer throw.

The cloth-holding clamp, whose specific construction will be hereinafter described, receives motion, as in all machines of this type, from a feed-wheel arranged below a slotted plate, 8. The clamp turns upon a slotted button attached to the plate 8 beneath the reciprocating needle, being guided in a fixed path of movement by a spring-pressed standard or pin traveling in the slot of plate 8. During its movement the clamp is held down in place and its motion steadied by a spring-pressed button provided with an upper flange overlapping the outer edge of the clamp and exerting constant pressure against the latter in the direction of the stationary guide-button upon the plate 8, and at right angles to the line of feed. Previous to my present invention this spring-pressed button has been located entirely above the bed-plate of the machine and resting upon its upper surface. The disadvantages attendant upon such construction are the liability of the thread and goods to be caught during the feeding operation beneath the button, and of the edge of the clamp-plate to work its way beneath the button, thereby receiving a sharp burr-edge, which frequently cuts the hand of the operator. To obviate these difficulties I have attached my button 7, by means of a countersunk rivet, and revolving freely thereon, to one end of a beveled plate, 9, which bears at its other end the fixed stud 73. The lower side of the bed-plate 8 is provided with a dovetail groove of about half the depth of the stock, forming a runway for the plate 9. A spring, 10, riveted at one end to the underside of the bed-plate, bears against the stud 73, exerting a constant pressure upon it, the plate 9, and the button 7, at right angles to the line of feed. Above the plate 9 the bed-plate 8 is slotted to permit the backward and forward movement of the button during the feed of the clamp, as shown in Fig. 6. The lower end of the button extending below the upper surface of the bed-plate 8, and its pressing-spring being located beneath such bed-plate, it is obvious that the arrangement of parts lessens the danger of interference with or catching of the goods or thread and prevents entirely the edge of the clamp from forcing its way beneath the button. At the same time the wide bearing secured between the beveled sides of the plate 9 and those of the dovetailed groove insures the button from tilting and holds the flange down firmly over the edge of the moving clamp.

In Figs. 7 and 8 I have illustrated my improved cloth holding and feeding clamp. It consists of a base-plate, 49, having a rearwardly-extending elevated frame-block, 50. The standard 77, which carries the guide-pin 54, is passed through this block and riveted to the base-plate in the usual manner. The arms 51 and 52 are pivoted directly to the frame-block, which is made in one piece and has two parallel grooves cut in its top to receive them. The block and arms are drilled for the reception of the pivot-pin upon which the said arms swing.

It is obvious that all that part of the elevated frame-block lying outside of where the grooves are cut could be dispensed with, and the arms attached by pivot-screws to the central portion remaining. I prefer, however, the construction shown, for the reason that by increasing the outer bearing-surface of the pivoted ends of the pressing-arms the said arms are, when in position, held more securely, side motion being prevented. The front ends of the pivoted arms are attached to pressing-feet 60 61 of the usual construction, said feet being provided on their upper surfaces with vertical lugs, to which the sides of the arms are attached by means of shoulder and screws, as shown. This mode of connection insures a firmer hold upon the material while being spread, and prevents lateral motion by reason of the increased bearing-surface secured. These advantages are rendered attainable from the fact that in my invention the pressing-arms are presented edgewise to the pressing-feet and eccentric pressing-lever, whereas in the old construction the flat surfaces of the said arms receiving and transmitting the pressure, the vertical lugs of the pressing-feet passed upward through slots cut in the front ends of the flat arms, affording a much less secure and durable connection.

By placing the pressing-arms edgewise I secure other important advantages. Thus I am enabled to dispense with the separate carrying-frame pivoted to the clamp-frame, which is present in all former constructions, my pressing-arms being connected directly with the clamp-frame extension 50. Moreover, in my invention the spreading-cams bear against the flat sides of the pressing-arms, instead of against their edges, as heretofore. The resiliency of the arms therefore is sufficient to return them to their original positions, no auxiliary means being required for that purpose. I also secure a much greater degree of strength in the arms, lessening their liability to break or spring when under pressure of the eccentric lever. The cost of manufacture is, moreover, materially lessened by my improvement, the arms 51 and 52 being cut by the same die, and requiring no bending to fit them into position upon the clamp-frame. On the contrary, where the pressing-arms are made in one piece in the old construction considerable labor is required to bend the arms to a proper shape and have them remain so after being tempered, inasmuch as they spring in tempering, and require careful hammering to bring them again to their original shape. The eccentric spreading-lever 53 is placed over the standard which holds the pin 54, which is of the usual spring-pressed kind. The lever is held down in place between the pressing-arms 51 52 and arms 58 59 by means of a collar secured to the standard by a set-screw, as shown in Fig. 7. By moving the spreading-lever arm in the direction of the arrow, Fig. 8, the eccentric presses against the flat sides of arms 51 and 52, and also against the edges of the lower arms, 58 and 59. The two sets of arms are accordingly spread open. When the lever is brought back and pressure released, the arms 51 52 return by virtue of their resiliency to their original positions, and, striking against pins 62 63 upon the arms 58 59, bring back the latter also.

The post 56 and eccentric pressing-lever 55 are of the usual construction. A coiled spring, 57, bearing a washer, is placed beneath the arms 51 and 52, pressing them upwardly against the bearing-washer of the eccentric lever, as shown in Fig. 1.

I do not confine myself to the location of the eccentric spreading-lever over the standard that carries the spring-pressed button 54. If more convenient, it may be placed over the post that carries the eccentric pressing-lever, and the result will be the same.

To regulate the length of the button-holes, I locate in the rear of the front straight slot in the plate 8 an adjusting-piece, 11, running in a dovetail groove in the said plate and held in position by a set-screw, 74, which presses against one of its sides when set. The front end of said adjusting-piece has a bent end, 75, which enters the slot of plate 8, said end forming an abutment, against which the projecting pin on the cloth-clamp stops when brought back to the proper starting-point by the hand feed-wheel, as will be hereinafter more fully set forth. The slotted plate 8 rests upon and is secured to the bed-plate of the machine by screws or otherwise. The bed-plate has cast within it suitable recesses for the reception of the cloth-clamp feed-wheel 13 and hand feed-wheel 12, having peripheral cogs intermeshing with each other. The hand feed-wheel is of one-third the diameter of the wheel 13, and is provided with a downwardly-extending pinion bearing a spoke-lever, 33.

Referring more particularly to Figs. 2 and 12, it will be seen that to the lower end of the vertical shaft 1 a disk, 14, is attached, said disk bearing on its upper surface a double cam, 15, one arm of which has a longer stroke than the other. The cam operates the feed-lever 23, pivoted to the bed-plate of the machine by means of a set-screw, 76. At one end the feed-lever bears the clamp feed-wheel pawls 25 26, secured to said end by means of a screw-pivot which passes through both their bodies.

To the pawl 26 is attached a spiral spring, 24, secured at its other extremity to the bed-plate, as shown. The function of this spring is to keep the free end of the feed-lever within the range of action of the double cam during the operation of the machine. The pawl 25 is one-half of a tooth of feed-wheel 13 shorter than pawl 26, and is pressed by a spring, 71, which is secured to the lever 23. Pawl 26 bears a disengaging-extension, 79, by means of which it may be released from the teeth of the feed-wheel. In its movement it strikes against and releases pawl 25 in a manner well understood in the operation of double pawls. The feed-lever is provided between its outer end and pivotal point with two adjustable pins, 27 and 28, held in place by set-screws, as shown, and adapted to strike against two steps, 32, forming the free terminal of a bent shipper-lever, 29, pivotally secured to the bed-plate. To the end of said lever next the feed-wheel is attached a pin bearing a friction-roller, 30, which, passing through a slot in the bed-plate of the machine, enters a cam-groove of the usual form in the under surface of the clamp feed-wheel.

To the under face of disk 14, and about half an inch from its center, is attached a bodied screw, 16. This screw bears the ends of two levers, 17 and 18, which thus receive about one-inch throw. To the levers are jointed, respectively, the short links 19 and 20, secured at their other ends by set-screws to the base-plate and resting upon suitable hubs provided for their reception. The link 20 is attached to the extreme end of lever 18, and the link 19 is attached to the lever 17 at about one inch and a half from the free end of the latter. The lever 18 is bent sidewise to escape interference with the lever 17, and also to span and avoid the opening in the bed-plate of the machine within which the looping mechanism operates.

On a line with the center of the machine a piece is provided on lever 18 to receive the thread-carrying looper-point 21, which is secured by the usual set-screw. The under thread passes from the under spool through an eyelet in the usual spiral tension-spring, thence through a second eyelet in the bed-plate, and finally to the bent needle or thread-carrying looper-point 21. The short looper-point 22 is inserted in the free end of lever 17, and is also secured by a set-screw.

The parts being constructed and arranged as described, the operation of the machine is as follows: The material to be worked is secured in the clamp and the button-hole cut preferably thereafter, the adjusting-piece 11 being set for the length of button-hole required. The clamp is then placed over the center guide-button on slotted plate 8. The spring-pressed pin 54, passing through the slot and abutting against piece 11, should then enter the heart-shaped cam-groove of the feed-wheel 13, and the beveled flange of button 7 overlap the edge of the clamp. If, however, the heart-shaped cam-groove is not in proper position to receive the pin 54, the clamp feed-wheel must be revolved either forwardly or backwardly until some portion of the groove is brought beneath the pin 54, whereupon the latter drops into it and the clamp is in position to commence sewing. The revolution of the clamp feed-wheel is effected by means of the hand-wheel 12, conveniently turned by the left hand of the operator. If a backward movement is required, the pawls 25 and 26 must first be released by pressing upon the extension 79, whereupon the wheel 13 is free to move backwardly. If a forward movement is necessary, the pawls must not be released. The clamp being now in position to commence sewing, we will assume the needle to be in its highest position. The movements of the driving-shaft will cause the needle to descend and penetrate the material at the desired distance back from its edge. The take-up descends with the downward movement of the needle and gives up sufficient thread to form a loop. As the needle pauses and then rises this loop is cast out and is entered by the shorter looper-point 22, and as the needle continues its upward movement the point carries the loop forward and impales it upon a stationary detainer-point, 35, where it is spread open by the point 22, so as to permit the entrance of the needle in its next descent. It will be evident from the relation of parts that when the needle has reached its highest point and it moves outwardly preparatory to its next descent the point 22 has reached the limit of its outward throw and is about to return. In Fig. 3 is illustrated in dotted lines its position, and that of the lever 17 and crank-pin 16, just after the beginning of this return movement. The loop being now fully spread and securely held upon the detainer-point 35, the needle, descending at twice the speed with which the looper-point 22 is moving, enters the said loop, a further movement of the crank-pin 16 releases the looper-point, and the loop is secured around the needle. The point 22 now assumes the position shown in Fig. 4. The needle, having once more reached its lowest point, casts out a second loop, which is entered by the thread-carrying point 21, as shown in Fig. 4. A further movement carries this loop, together with its own thread, around the detainer-point 34 to a position in front of the needle-hole. The needle in its next downward stroke enters the impaled or spread loop, thus interlocking the loop taken from the upper needle with the thread given out from the looper-point 21. In its subsequent rise the needle casts out another loop, which is entered by the point 22, as hereinbefore described, for the commencement of the next stitch.

I am aware that bent looper-points of similar construction have been before used in connection with spreading-points acting independently of the looper-points, and brought into action after the loopers had taken the loop from the needle, their function being to enter one side of the loop and spread it open, so that the needle might enter it in the next downward stroke. In this method the thread-carrying looper-point travels in a straight line at right angles to the line of feed, and after having passed through the needle-loop the thread from its point is entered by a moving double-point spreader and pushed forward, so that the needle in its next downward stroke may enter it. In my invention, on the contrary, I complete the stitch without the aid of a moving spreader, and instead of carrying the thread of the under looper first behind the needle-hole and next in front of the needle after it has entered the loop, I carry it in front of the needle next to the right-hand side, next around the detainer, and finally around the needle, where the thread is lodged preparatory to making the next stitch. By this movement I cause the under thread to interlock the loops formed from the upper thread in such a manner as to insure an unbroken chain or rib of stitches across the top edge of the button-hole, thus completely covering the edge, even where a coarse feed is used. This manner of looping the under thread is the reverse of all other button-hole stitches, as will be seen with reference to Fig. 15.

In Fig. 15 the under side of the work is shown through the upper or outside of the button-hole, and in this view a very clear idea can be obtained of the manner in which the lower thread, 65, is looped through the upper. The under thread is formed in a spiral row of stitches, 65, interlocked, as shown, with the stitches 80 of the upper thread, the inner portion, 64, of the stitch-row 65 extending along the upper edge of the button-hole, forming a continuous protecting-line. The under thread is shown separately in Fig. 14, wherein it will be seen that the outer points of the same row are separated by intervening spaces. This outside edge, 65, would represent the inner edge of work done by prior machines.

In Fig. 13 is represented the path traveled by the loopers 21 and 22.

The manner of forming the loops, as described, enables me to complete the stitch with less slack thread and less tension, each loop being formed and secured while under tension before the preceding one taken off is released. This causes a pull on the upper and lower threads at the same time, which has a tendency to hold down the edge of the material upon the centered button without the aid of a pressing-foot.

It is obvious that should I desire to sew with the single upper thread and dispense with the under thread, I can readily do so by removing the thread-carrying looper-point 21 and inserting in its stead a looper-point similar to point 22. The substituted point should be, however, a left point, the other being its right. The stitch thus made would be a chain-stitch, each alternate loop being interlocked. The length of the stitch is regulated by means of the adjustable pins 27 28 upon the feed-lever 23. When sewing the straight sides, the pin 28 is set so that the longest arm of the cam 15 strikes the end of the lever 23 in such manner as to carry the pawls 25 and 26 over one tooth, one and a half tooth, or two teeth of the wheel 13, according to the length of stitch required. When sewing the eye, the roller 30 upon the shipper-lever enters that portion of the cam-groove in the feed-wheel which is nearest the center of the latter. The free end of the lever consequently falls, assuming the position shown in dotted lines in Fig. 2. The outer end of the feed-lever now comes within the range of action of both arms of the cam 15. Owing to the curvature of the cam-groove, the pawls travel over four teeth while making each stitch on the outer circle, and over two teeth while making each stitch in the center of the eye. To make a closer feed around the eye, it is necessary to adjust the pin 28 so that it will strike on the top step of the shipper-lever and lessen the distance of the throw, so that the pawls will travel over one tooth and three teeth alternately. The stitch on the side is regulated by raising or lowering the pin 27.

Having thus described my invention, what I claim, and desire to secure by Letters Patent, is—

1. The combination, with the cloth-clamp and the slotted plate 8, of the spring-pressed guide-button 7, having its lower face extending below the upper surface of said slotted plate, substantially as described.

2. The combination, with the cloth-clamp and the slotted plate 8, of the spring-pressed guide-button 7, having the lower face extending below the upper surface of said slotted plate and connected to the under plate, 9, also below the surface of the slotted plate 8, substantially as described.

3. The combination, with the cloth-clamp and the slotted plate 8, the latter being provided with a dovetailed groove, of a plate, 9, fitted within said groove, a guide-button, 7, and pin 73, mounted upon the plate, and a spring, 10, bearing against said pin, substantially as described.

4. The combination, with the feed-wheel, the slotted plate 8, and the clamp bearing the guide-pin 54, traveling within said slot, of the adjustable piece 11, fitted within a dovetailed groove at the front end of the slot, substantially as shown and described.

5. The combination, with the reciprocating needle, needle-bar, and means for operating the same, of the vertical shaft, levers 17 and 18, eccentrically connected to said shaft, guiding mechanism, substantially as described, for the looper-point ends of the levers, thread-carrying looper-point 21, short looper-point 22, and stationary detainer-points 34 and 35, substantially as shown and described.

6. The combination, with the reciprocating needle, needle-bar, and means for operating the same, of the vertical shaft 1, disk 14, crank-pin 16, levers 17 and 18, links 19 and 20, thread-carrying looper-point 21, short looper-point 22, and stationary detainer-points 34 and 35, substantially as described.

7. The combination, with the feed-wheel 13, of the pivoted feed-lever 23, bearing the pawls 25 26 and stitch-adjusting pins 27 28, and spring 24, the shipper-lever 29, and the vertical shaft 1, and disk 14, the latter bearing a double cam, 15, one arm of which is longer than the other, substantially as shown and described.

8. The combination, with the cloth-clamp base-plate 49, of the arm-supporting frame 50, presser-feet 60 61, eccentric spreader 53, pressing-arms 51 52, pivoted directly to the frame 50, and presenting their flat sides to the spreader and edges to the pressing-feet, the guide-pin 54, post 56, coil-spring 57, under spreading-plates, 58 59, and eccentric pressing-lever 55, and means, as pins 62 63, whereby the return movement of the pressing-arms is communicated to the under spreading-plates, substantially as shown and described.

9. In a cloth-clamp for button-hole sewing-machines, the combination, with the base-plate 49, of the elevated frame 50, the under spreading-plates, 58 59, having pin projections 63 62, the presser-feet 60 61, spreader 53, presser-arms 51 and 52, bearing against the pin projections and presenting their edges to the presser-feet and their sides to the spreader, the spring 57, post 56, guide-pin 54, and pressing-lever 55, substantially as shown and described.

THOMAS F. HAGERTY.

Witnesses:
 LAURENCE CURRAN,
 HUGH W. FORBES.